United States Patent
Hall

(12) 
(10) Patent No.: US 6,332,706 B1
(45) Date of Patent: Dec. 25, 2001

(54) METHOD FOR AERATING WINE

(75) Inventor: Roger C. Hall, Eugene, OR (US)

(73) Assignee: Wine Swirl, LLC, Eugene, OR (US)

( * ) Notice: Subject to any disclaimer, the term of this patent is extended or adjusted under 35 U.S.C. 154(b) by 0 days.

(21) Appl. No.: 09/551,286

(22) Filed: Apr. 18, 2000

(51) Int. Cl.⁷ ............................. B01F 3/04; B01F 13/08; C12G 1/00
(52) U.S. Cl. ................ 366/274; 366/348; 99/323.1; 426/474; 261/83; 261/84
(58) Field of Search ............................. 366/273, 348, 366/274; 99/323.1; 426/474; 261/83, 84

(56) References Cited

U.S. PATENT DOCUMENTS

| | | |
|---|---|---|
| 2,951,689 * | 9/1960 | Asp et al. . |
| 3,854,704 | 12/1974 | Balas . |
| 4,145,383 | 3/1979 | Randall . |
| 4,162,129 | 7/1979 | Bartholemew, Jr. . |
| 4,494,452 | 1/1985 | Barzso . |
| 4,526,730 | 7/1985 | Cochran et al. . |
| 4,675,191 * | 6/1987 | Villettaz . |
| 4,785,724 | 11/1988 | Vassallo . |
| 4,808,419 | 2/1989 | Hsu . |
| 5,075,234 | 12/1991 | Tunac . |
| 5,595,104 | 1/1997 | Delaplaine . |
| 5,713,263 | 2/1998 | Burks, III . |
| 6,082,204 * | 7/2000 | Munderloh . |

OTHER PUBLICATIONS

Lum Eisenman, The Home Winemakers Manual, chapter 23.*

* cited by examiner

Primary Examiner—Charles E. Cooley
Assistant Examiner—David Sorkin
(74) Attorney, Agent, or Firm—Chernoff, Vilhauer, McClung & Stenzel, LLP

(57) ABSTRACT

A method for aerating wine comprises the steps of pouring wine into a container, placing the container on top of a stir plate, placing a stir bar inside the container, and changing a magnetic field within the stir plate so as to cause the stir bar to rotate within the container. The method may be used with either a flat bottomed bottle or decanter. In a preferred method, the stir plate is provided with a rotatable magnetic arm and a variable speed controller for controlling the speed at which the rotatable arm rotates.

9 Claims, 4 Drawing Sheets

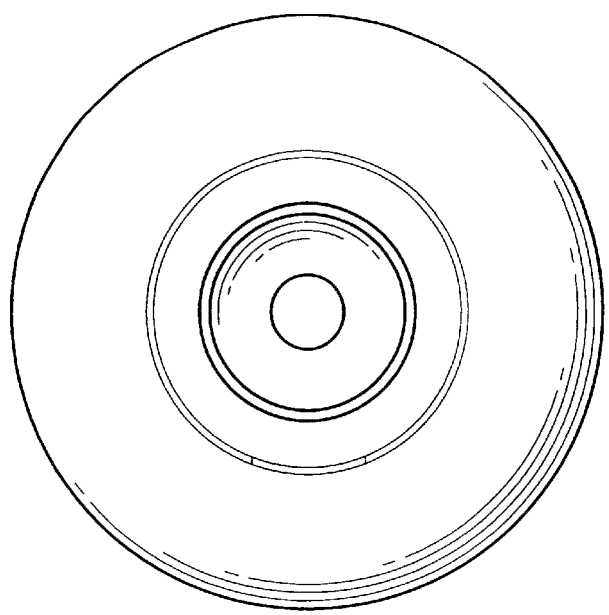
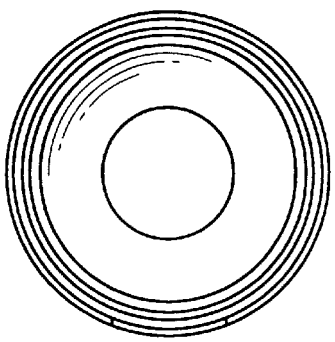
FIG.9    FIG.5
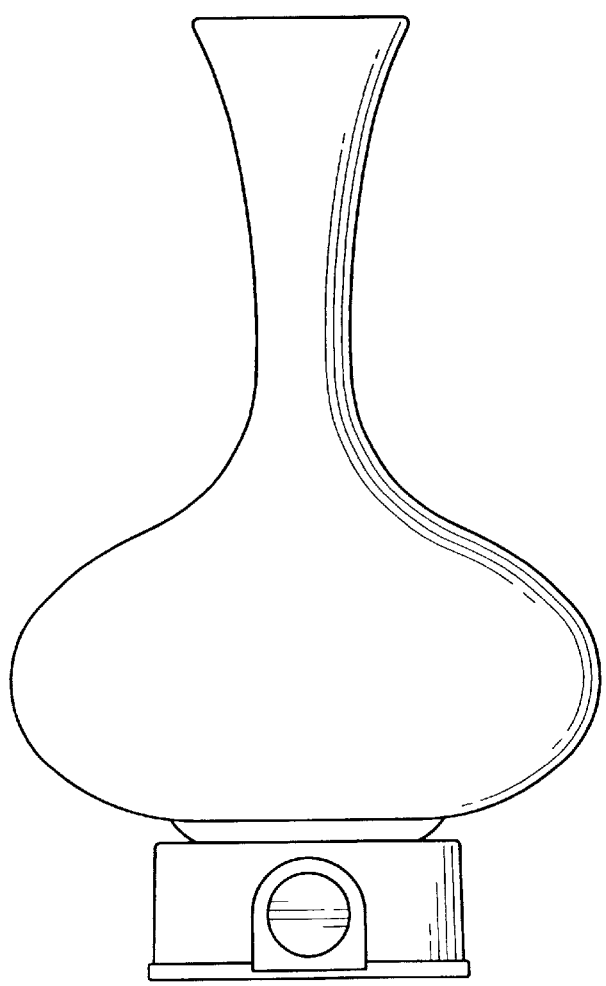
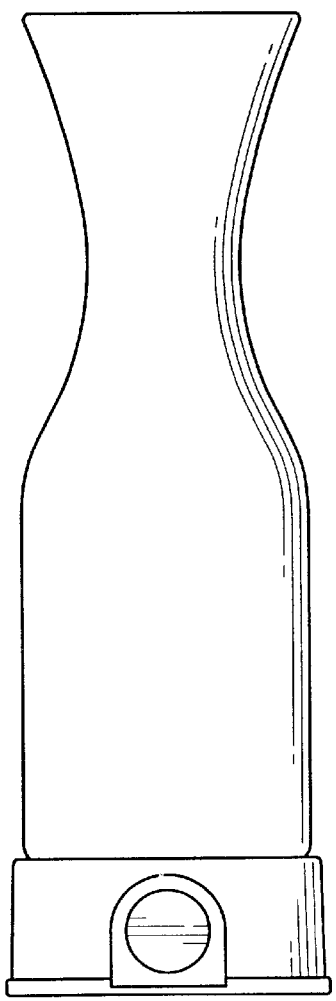
FIG.7    FIG.3

METHOD FOR AERATING WINE

BACKGROUND OF THE INVENTION

The present invention relates to a method for aerating wine.

It has long been recognized that aeration of wine, particulary red wine, improves the taste of the wine. Generally, the wine is decanted for an extended period so that the wine is able to "breath," and becomes aerated. Because the period of time required to aerate the wine is quite long, on the order of up to several hours or more, there has been a good deal of effort in the prior art to create a means to accelerate the process. However, such devices for aerating wine must do so without altering the composition and therefore flavor or aroma of the wine.

One method used to aerate wine involves bubbling air through the wine. Exemplary of devices used to aerate wine in this fashion is the aerator disclosed in Delaplaine, U.S. Pat. No. 5,595,104. This aerator comprises a power control box, a stopper, a submersion rod, and an aeration element. The aerator is affixed in a wine bottle by the stopper. The stopper includes vents to allow air flow from the interior of the bottle to the exterior. In use the aerator is fitted into the opening of the bottle, and the rod extends the aeration element to a position near the bottom of the bottle so that it is completely submerged. The pump draws air in through the air inlet into the pump, and then forces the air into the rod. The air then flows outward into the wine through air holes in the aeration element.

Bubbling type devices, however, suffer from several drawbacks. There is a fear among wine enthusiasts that the bubbling action may be too violent and may break down the complex molecules and other species that lend the wine its aroma and flavor. In addition, such devices may contaminate the wine through a variety of mechanisms. The use of a pump may contribute pump oil or other contaminants, such as dust, into the air which is pumped into the wine. Additionally, the rod and aeration element may include contaminants. Accordingly, the device must be thoroughly cleaned between each use. However, the aeration element, with its plurality of holes, is difficult to thoroughly clean. The device also has the drawback that it is not universal. The length of the rod limits the use of the device, since the length of the rod determines the size of the bottle with which the device may be used. Thus, several different sizes of aerators must be kept on hand to allow use of a wide variety of bottle types and decanter styles.

Vassallo, U.S. Pat. No. 4,785,724 discloses a similar type of bubbling device used to aerate wine, except that in this device a telescoping rod is employed to allow variation in the size of the bottle. Nevertheless, the device disclosed in Vassallo, U.S. Pat. No. 4,785,724 presents the same risk of impairment of the wine composition, as well as introduction of contaminants. Further, the device in Vassallo, U.S. Pat. No. 4,785,724 requires assembly of the delivery tube with each use. This tube may be subject to wear, which could cause the seal to fail and thus impair aeration of the wine.

Yet another type of bubbling device is disclosed in Barzso, U.S. Pat. No. 4,494,452. This device includes a tubular extension which fits over the wine bottle. Various sizes of tubular extensions must be maintained to allow use of the device with bottles and decanters of various shapes and sizes.

Another method to aerate wine has involved devices that cause the wine to be agitated in order to mix the wine with air. One such device is disclosed in Burks, III, U.S. Pat. No. 5,713,263. This device includes a housing for containing the wine and air, a baffle within the housing, and a valve. The housing is inverted to mix the wine and air, and the valve prevents the leakage of wine from the housing interior. This device also suffers several drawbacks. Like the bubbling devices, there is a fear that the violent agitation produced by inversion of the housing and passage through the baffles may alter the composition of the wine. In addition, this device also poses a substantial risk of contamination. The device has a large surface area of material in contact with the wine, in particular the surface area of the several baffles. These must be thoroughly cleaned between uses. The valve also presents a potential location for contaminants, but is not easily cleaned. The device also requires the use of a particular size of housing. Thus, it is not available for use with bottles, or with decanters of other shapes or sizes.

Bartholemew, Jr., U.S. Pat. No. 4,162,129 discloses another device used to mix air and wine. This device includes a motor driven oscillating coupler for connecting two wine containers to pour wine from one container to the other upon oscillation of the coupler and the containers. The coupler includes a valve for allowing outside air to be conducted into the coupler and containers while preventing splashing of the wine during pouring from one container to another. This device is awkward to use and poses a risk of spilling or splashing wine. The device also requires disassembly of the coupler to allow cleaning. The device further requires the use of particular types of carafes sized to fit the coupler and including connection means, such as threads, to attach the carafes to the coupler.

What is therefore desired is a method and apparatus for aerating wine that does not violently agitate the wine, that reduces the risk of contamination of the wine, that may be used with wine flat bottomed bottles, decanters and carafes of various shapes and sizes, and that minimizes the risk of spillage.

BRIEF SUMMARY OF THE INVENTION

The present invention overcomes the drawbacks of the prior art by providing a method for aerating wine, comprising the steps of pouring wine into a container, placing the container on top of a stir plate, placing a stir bar inside the container, and changing a magnetic field within the stir plate so as to cause the stir bar to rotate within the container. The method may be used with almost any kind of flat bottomed bottle, decanter or carafe. In a preferred method, the stir plate is provided with a rotatable magnetic arm and a variable speed controller for controlling the speed at which the arm rotates.

The invention provides several advantages. First, the invention substantially speeds the process of aerating the wine. The stir bar creates a vortex within the wine, thus increasing the surface area of the wine in contact with air. Since aeration is a function of the surface area of the wine in contact with air, the aeration process may be increased. In addition, the stirring effect also contributes to the process of aeration.

The method also improves aeration without many of the drawbacks attendant to the prior art. The method minimizes the risk of altering the wine by providing a relatively gentle, controllable stirring mechanism. In addition, the method substantially reduces the risk of contamination of the wine. The method does not utilize a pump to bubble air through the wine. The method introduces only a very small stir bar into the wine. The small size and nature of the stir bar is such that the risk of contamination is substantially reduced. The method can also be used with a wide variety of flat bottomed bottles, carafes, and decanters of various shapes and sizes.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is a front view of one embodiment of a transparent container and stir plate of the present invention.

FIG. 5 is a top view of the embodiment of FIG. 3.

FIG. 7 is a front view of another embodiment of a transparent container and stir plate of the present invention.

FIG. 9 is a top view of the embodiment of FIG. 7.

DETAILED DESCRIPTION OF THE PREFERRED EMBODIMENTS

Figure 1:
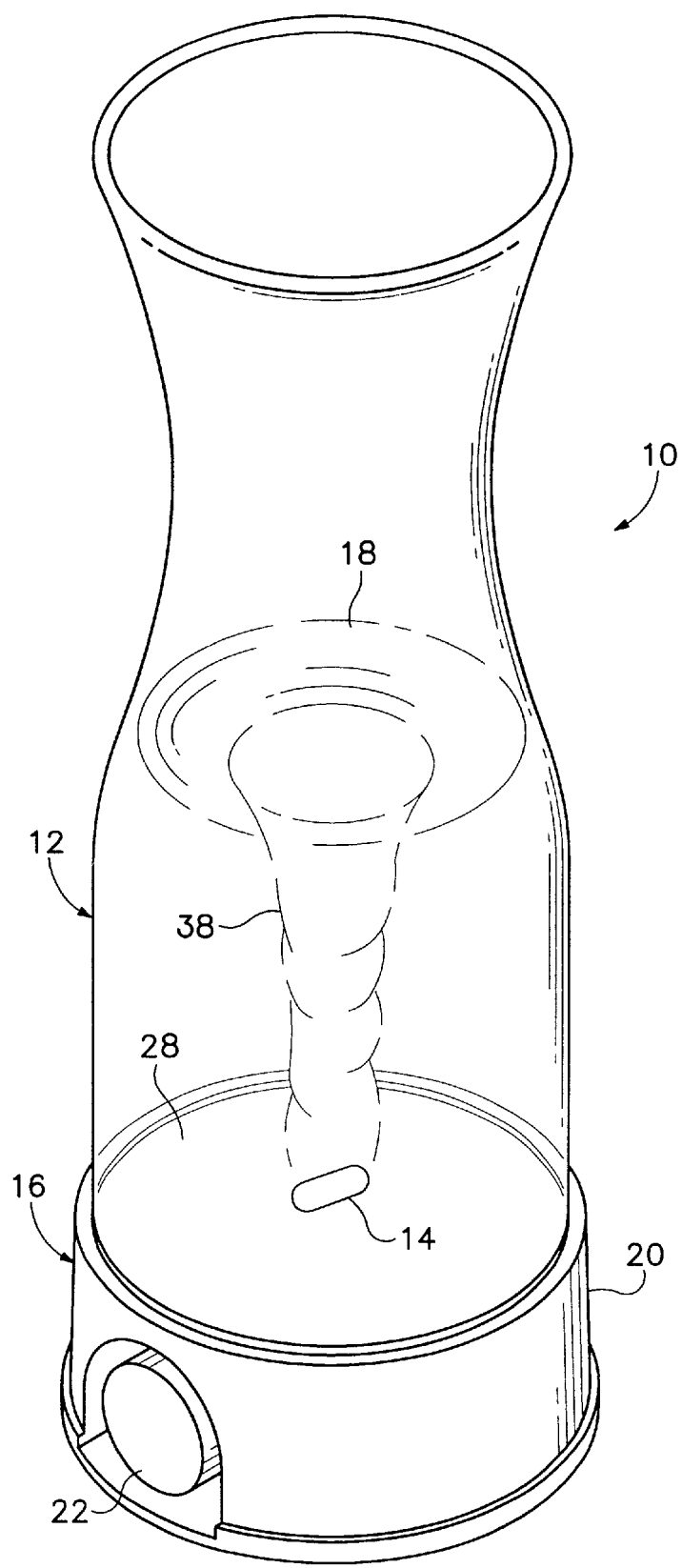
FIG. 1 is a perspective view of a container, stir bar, and stir plate of the present invention.

Referring now to the figures, wherein like numerals refer to like elements, FIG. 1 shows an aerating device 10 comprising a container 12, stir bar 14 and stir plate 16. The container holds wine 18. Container 12 may be any flat bottomed container suitable for containing wine, such as a bottle, carafe or decanter. Wine bottles having punts are disfavored, since the punt interferes with rotation of the stir bar as discussed below. Otherwise, any shape or size of container may be employed that fits on the stir plate 16. The containers shown in FIGS. 1–10 are transparent, but the invention finds utility with opaque containers as well as containers made of glass or plastic.

Figure 2:
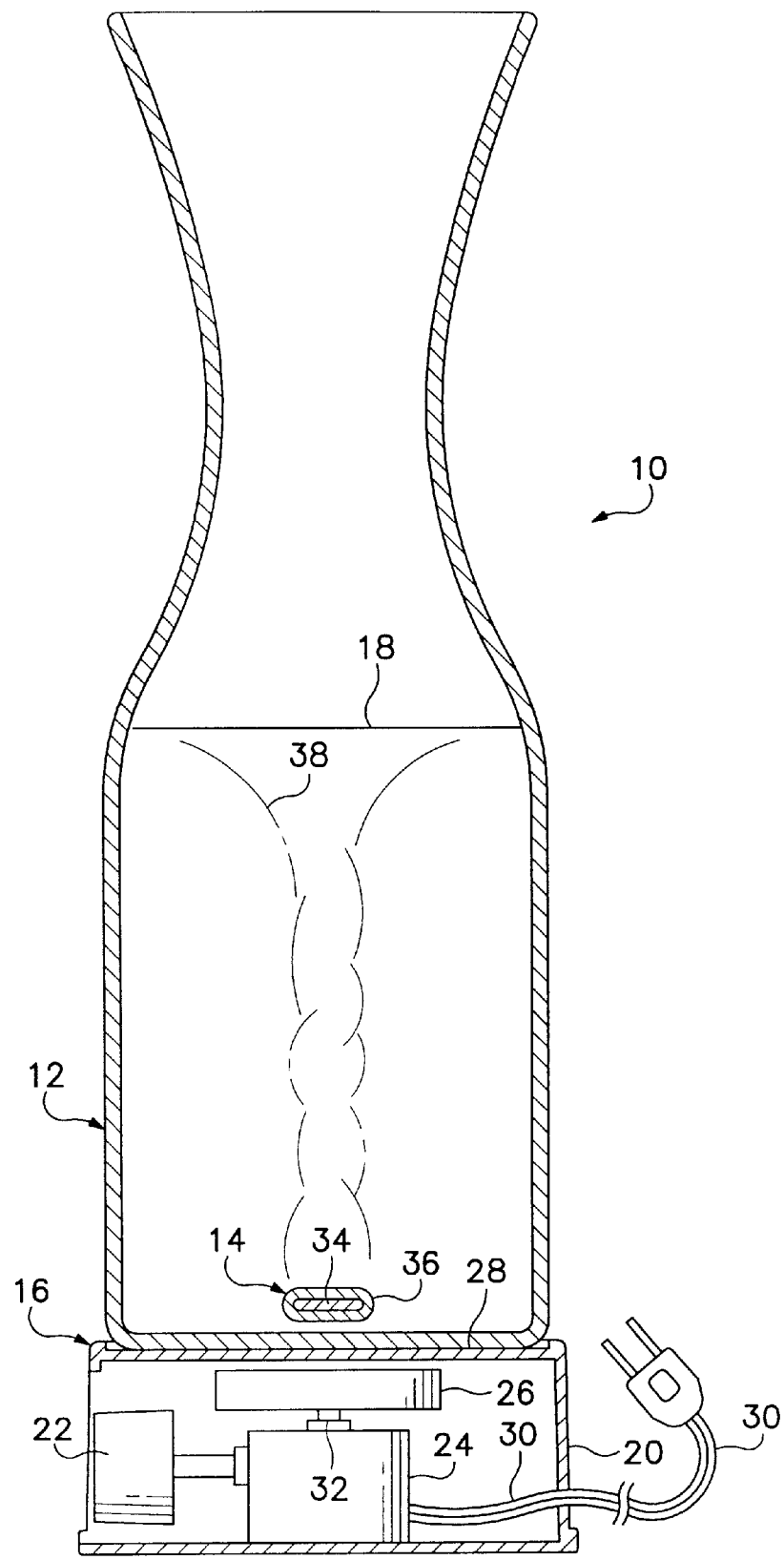
FIG. 2 is a cross section of the embodiment of FIG. 1.
Figure 8:
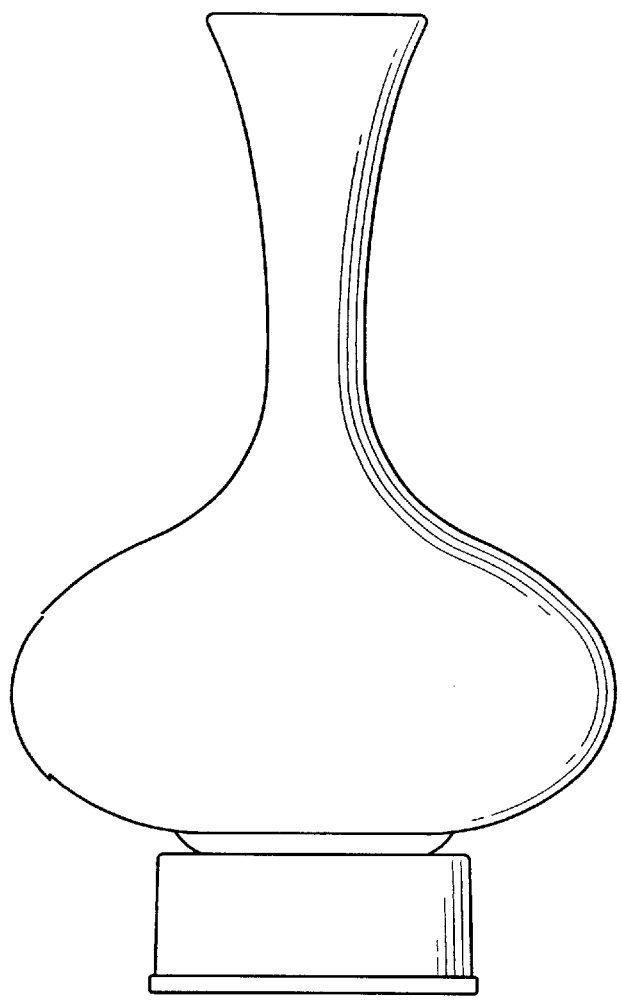
FIG. 8 is a rear view of the embodiment of FIG. 7.
Figure 4:
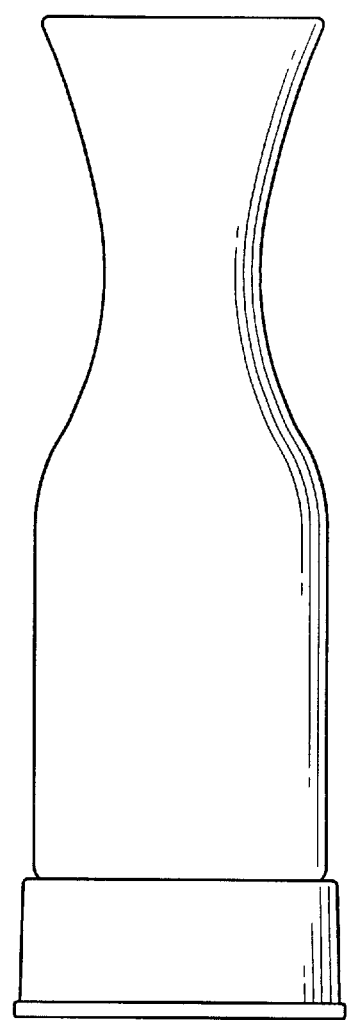
FIG. 4 is a rear view of the embodiment of FIG. 3.
Figure 10:
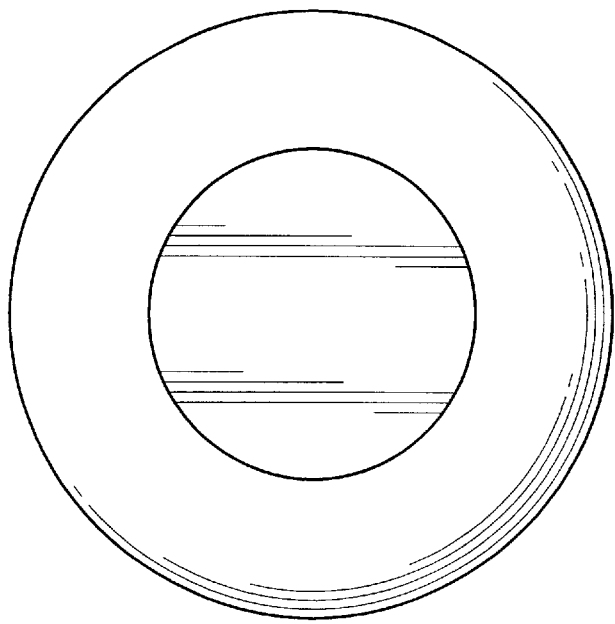
FIG. 10 is a bottom view of the embodiment of FIG. 7.
Figure 6:
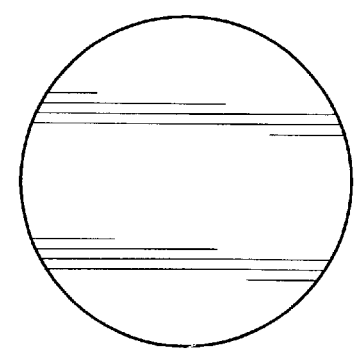
FIG. 6 is a bottom view of the embodiment of FIG. 3.

Referring now especially to FIG. 2, the stir plate 16 is itself comprised of a housing 20 containing a knob 22, an electric motor 24, and a rotatable arm 26. The stir bar 14 and rotatable arm 26 are magnetically attracted to each other. The top 28 of the housing 20 is substantially flat to support the container. In addition, the housing 20 is made of a non-ferrous material such as plastic so as to allow magnetic interaction between the stir bar and rotatable arm 26. The housing is sized to be large enough to accommodate a wide variety of bottles and carafes. The knob 22 is connected to a variable speed electric motor 24. A power cord 30 provides power to the motor 24, but alternatively a battery could be used. The rotatable arm 26 is connected to the electric motor 24 by a drive shaft 32. Preferably the arm 26 is magnetic. The motor 24 causes rotation of the arm 26 beneath the surface of the top 28 of the housing 20. The motor is preferably a variable speed motor, so that rotation of the knob 22 causes the electric motor to increase or decrease the rate of rotation of the arm 26. The stir plate 16 may be a model HI 180 stirrer from Hanna Instruments of Woonsocket, R.I.

The stir bar 14 is preferably comprised of a central core 34 surrounded by a coating 36. The central core 34 is preferably a magnet. The coating surrounding the central core 34 is preferably a material that resists accumulation of contaminants and is easily cleaned, such as a synthetic resinous fluorine-containing polymer sold under the trademark TEFLON®. The nature of the stir bar reduces the risk of contamination of the wine. The stir bar is relatively small and has a small surface area, thus minimizing the amount of foreign surface area in contact with the wine. In addition, the coating minimizes the risk of contamination of the wine by providing a coating that resists contaminants and is easy to clean. Stir bars may be obtained from Hanna Instruments.

In operation, the stir bar 14 rotates within the housing 12 to cause the wine to be aerated. The stir bar 14 rotates due to a magnetic interaction between the stir bar 14 and the rotating arm 26. In the preferred embodiment, both the stir arm 14 and rotating arm 26 are magnets. However, only one of the stir arm 14 and arm 26 need be a magnet, so long as the other contains enough ferrous material to provide a sufficient magnetic attraction. In addition, while a rotating arm 26 has been described, other mechanisms may be used to provide a changing magnetic field within the stir plate 16 so as to cause the stir bar 14 to rotate. For example, the electric motor 24 could be replaced by a series of wire coils and one or more transformers which would cause electric current to be supplied to the coils in a manner to cause the stir arm 14 to rotate.

The device 10 thus may be used as follows. Wine 18 is poured into the container 12. The container 12 is placed on top of the housing 20. The knob 22 is turned to cause the electric motor 24 to rotate the rotating arm 26. The magnetic attraction between the rotating arm 26 and stir bar 14 causes the stir bar 14 to rotate, which then begins stirring the wine 18. The degree of spinning of the stir bar 14 can be controlled by the knob 22. The speed of rotation of the stir bar 14 is selected to cause a vortex 38 to appear in the wine. The vortex substantially increases the surface area of the wine in contact with the air. The size of the vortex can be controlled by controlling the rate of rotation of the stir bar 14. By controlling the size of the vortex, the amount of surface area in contact with the air can be controlled, and thus the rate of aeration may be increased or decreased. Since the surface area of the vortex can be substantially greater than the surface area of the undisturbed wine, the rate of aeration relative to undisturbed wine may be substantially increased. For example, 750 mL of wine may be aerated using the method of the present invention in only 30 minutes, while undisturbed the same volume may require four to eight hours.

The present invention may be used with a wide variety of ornamental designs and features. One such ornamental design is shown in FIGS. 3–6 which features a transparent glass decanter. The ornamental features of this design are comprised of the transparent container, the relative size and shape of the container, the relative size and shape of the stir plate, and the location of the knob. Similarly, another ornamental design is shown in FIGS. 7–10 which also features a transparent glass decanter. The ornamental features of this design are similarly comprised of the transparent container, the relative size and shape of the container, the relative size and shape of the stir plate, and the location of the knob.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for aerating wine for drinking, comprising:
   (a) pouring the wine into a container;
   (b) placing said container on top of a stir plate;
   (c) placing a stir bar inside said container;
   (d) changing a magnetic field within said stir plate so as to cause said stir bar to rotate within said container thereby establishing a vortex in the wine, said vortex having a surface area in contact with air; and
   (e) controlling the rate of rotation of said stir bar and thereby the surface area of said vortex so as to aerate the wine for consumption.

2. The method of claim 1 wherein said container is a flat bottomed wine bottle.

3. The method of claim 1 wherein said container is a glass decanter.

4. The method of claim 1 further comprising the step of providing a rotatable arm within said stir plate.

5. The method of claim 4 further comprising the steps of providing a variable speed controller in said stir plate and controlling the rate of rotation of said rotatable arm with said speed controller.

6. The method of claim 4 wherein said arm is magnetic.

7. The method of claim 1 further comprising the step of providing a coating around said stir bar.

8. The method of claim 7 wherein said coating is a polymeric material.

9. The method of claim 1 wherein said stir bar is magnetic.

* * * * *